US010484252B2

(12) United States Patent
Rotstein et al.

(10) Patent No.: US 10,484,252 B2
(45) Date of Patent: Nov. 19, 2019

(54) MULTI-RATE HIGH-SPEED BUS WITH STATISTICAL AGGREGATOR

(71) Applicant: INTEL IP CORPORATION, Santa Clara, CA (US)

(72) Inventors: Ron Rotstein, Tel Aviv (IL); Gil Zukerman, Hod-HaSharon (IL); Zeev Gil-Ad, Qiriat-Onoi (IL)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/607,353

(22) Filed: May 26, 2017

(65) Prior Publication Data
US 2017/0264457 A1 Sep. 14, 2017

Related U.S. Application Data

(62) Division of application No. 14/575,187, filed on Dec. 18, 2014.

(51) Int. Cl.
H04L 12/28 (2006.01)
H04L 12/26 (2006.01)
H04L 12/40 (2006.01)
H04L 29/06 (2006.01)
H04L 12/813 (2013.01)

(52) U.S. Cl.
CPC ............ H04L 43/04 (2013.01); H04L 12/40 (2013.01); H04L 12/40013 (2013.01); H04L 29/06 (2013.01); H04L 43/08 (2013.01); H04L 47/20 (2013.01); H04L 69/18 (2013.01)

(58) Field of Classification Search
None
See application file for complete search history.

(56) References Cited

U.S. PATENT DOCUMENTS

| 5,031,179 | A | 7/1991 | Yoshida et al. | |
|---|---|---|---|---|
| 2010/0005178 | A1* | 1/2010 | Sindelaru | ............... H04L 47/10 709/228 |
| 2010/0161842 | A1 | 6/2010 | Shan et al. | |
| 2015/0365220 | A1* | 12/2015 | Sultenfuss | ............ H04L 5/0096 370/536 |

OTHER PUBLICATIONS

Non-Final Office Action dated Dec. 30, 2016 for U.S. Appl. No. 14/575,187, 17 pages.
Notice of Allowance dated Jun. 20, 2017 for U.S. Appl. No. 14/575,187, 17 pages.

* cited by examiner

Primary Examiner — Zewdu A Beyen
(74) Attorney, Agent, or Firm — Schwabe, Williamson & Wyatt, P.C.

(57) ABSTRACT

A single high-speed bus accommodates both low-rate and high-rate bi-directional signal traffic by interleaving the traffic at the two rates sequentially so that all the data in the bus at any given time is either high-rate or low-rate. The interleaving is executed by a statistical aggregator according to a policy tailored to the traffic expected in the particular bus. The policy may be static and predetermined, or it may be dynamic and adaptive. Adaptive policies are continually updated with predictions of future traffic based on the statistics of past and/or present traffic. The technique may be implemented in both on-chip and system-level bus interfaces.

17 Claims, 7 Drawing Sheets

MULTI-RATE HIGH-SPEED BUS WITH STATISTICAL AGGREGATOR

RELATED APPLICATIONS

This application claims the benefit of priority from U.S. Non-Prov. patent application Ser. No. 14/575,187 filed Dec. 18, 2014 which is entirely incorporated by reference herein.

FEDERALLY SPONSORED RESEARCH AND DEVELOPMENT

None

APPENDICES

None

FIELD

Related fields include multi-rate data transmission, and more particularly interleaving data of different rates on a shared bus.

DETAILED DESCRIPTION

Figure 1:
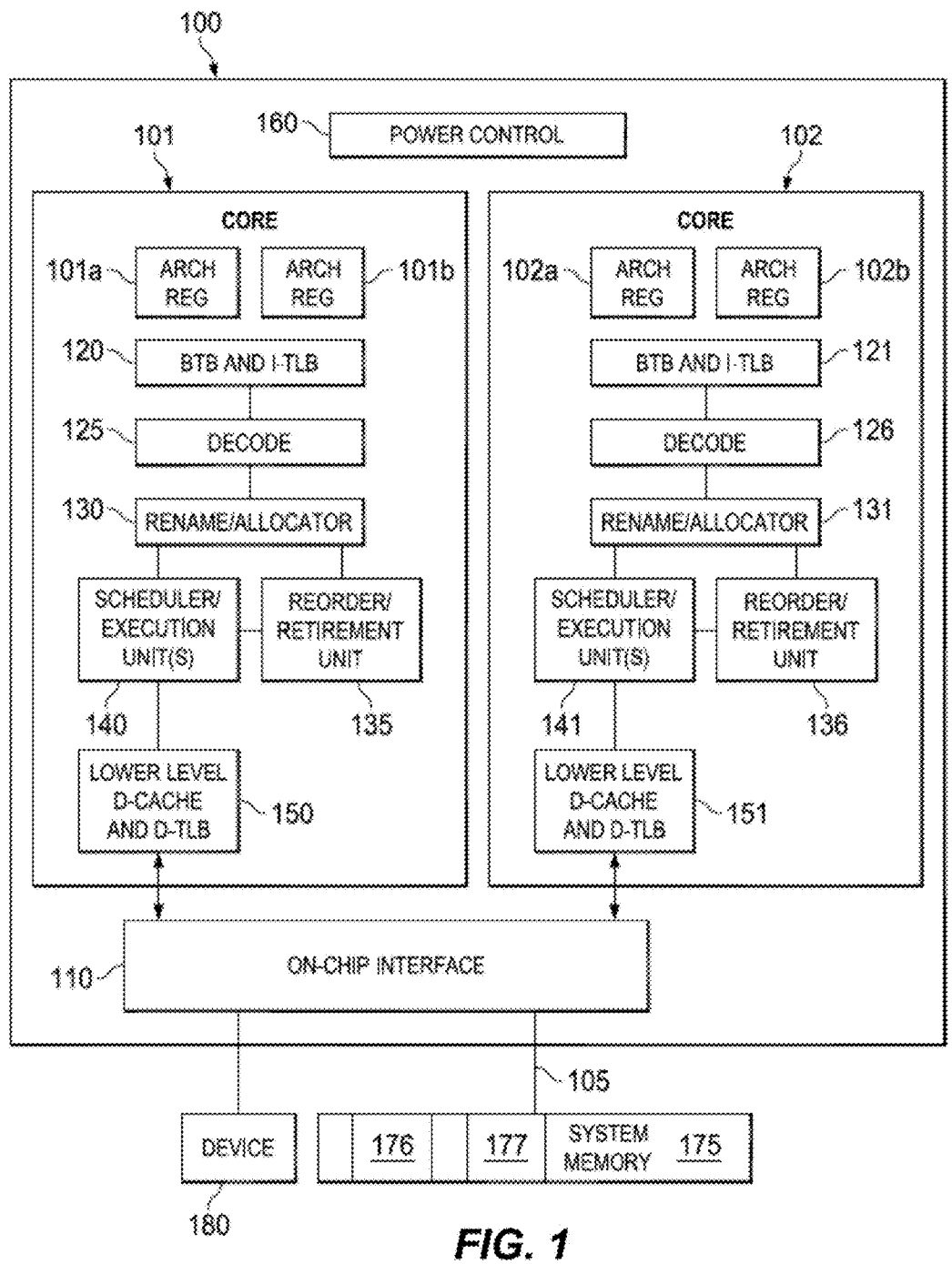
FIG. 1 is a diagram illustrating an embodiment of a block diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etcetera in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that may perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

Note that the apparatus, methods, and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and core 102, which may include asymmetric cores or symmetric cores (the illustrated embodiment). Alternatively, processor 100 may include any number of processing elements that may be asymmetric or symmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocation and renaming block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocation and renaming block 130 includes an allocator to reserve resources, such as register files to store instruction processing results. However, threads 101a and 101b are potentially capable of out-of-order execution, where allocation and renaming block 130 also reserves other resources, such as reorder buffers to track instruction results. Allocation and renaming block 130 may also include a register renaming module to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further away from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 110 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as a multi-drop bus, point-to-point interconnect, serial interconnect, parallel bus, coherent (e.g. cache coherent) bus, layered protocol architecture, differential bus, or a GTL bus.

Memory 175 may be dedicated to processor 100 or shared with other devices in a system. Common examples of types of memory 175 include DRAM, SRAM, non-volatile memory, and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etcetera in one or more phases of compilation, such as insertion of calls/operations in a front-end phase of compilation and then transformation of the calls/operations into lower-level code during a transformation phase. In some implementations, during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Systems and methods of the present disclosure include transmitter devices. The transmitter devices include a high-speed driver domain having a low-dropout regulator. The low-dropout regulator reduces a voltage level from an input voltage source to the high-speed driver domain. In addition, the transmitter devices include a low-speed driver domain. The low-speed driver domain includes a pre-driver which reduces a voltage level from an input voltage source to the low-speed driver domain.

New electronic devices are under constant market pressure to provide more and more versatility in a smaller space while using less power. For example, a smartphone that fits easily in the hand may be equipped to transmit and receive cellular signals, WiFi signals, GPS signals, short-range signals, and FM radio signals. Each of these transceiver modules needs to be connected to the application processor; enough physical space must be allocated to the interconnections to produce a satisfactory signal quality. Smartphones and tablets, as portable wireless devices, benefit greatly from reducing power consumption and thereby extending battery life.

Some types of signal may be transmitted and received at more than one rate. For example, a video streaming signal may include both low-rate traffic/low-speed packets (e.g., audio) transmitted in a low-speed transmission mode and high-rate traffic/high-speed packets (e.g., video) transmitted in a high-speed transmission mode. In many applications, a low-rate link needs to be available at all times. Traditionally, separate bidirectional buses have been provided for the different data rates. For example, in some multiple communications ("multi-com") chipsets and system-on-chip ("SoC") devices, industry standard Synchronous Backplane Interconnect (SBI), Inter-Integrated Circuit (FC) or Universal Asynchronous Receiver/Transmitter (UART) buses are provided for low-rate traffic, and either standard Peripheral Component Interconnect Express (PCIe) or Universal Serial Bus (USBx) buses or proprietary buses are provided for high-rate traffic. Pairs of these low-rate and high-rate bidirectional buses may connect multiple cores and other chipset components on SoCs.

In adapting or re-using existing SoC designs, high-rate buses may sometimes be allocated to low-rate traffic simply because they are available in a convenient position on the chip. The low-rate data is not compromised, but unnecessary energy is wasted in operating specialized features of the high-rate buses that are not needed for low-rate traffic. These power-consuming features include phase-locked loops (PLLs), bus terminators, and bus drivers.

Some embodiments of a data bus, instead of carrying only a single data rate, carry different data rates sequentially. That is, at one point in time they may carry high-rate traffic and another point in time they may carry low-rate traffic. Because either or both data rates may be ready to transmit or receive at any given time, the challenge is to coordinate the sharing of the bus—to "interleave" the low-rate and high-rate traffic—efficiently and with minimum error under constantly changing conditions. Although these examples will discuss only two different data rates (low and high), the principles are easily extended to accommodate three or more detectably different rates.

The definitions of "low-rate" and "high-rate" may vary with the type of device. In media players, the low-rate traffic may be audio packets at a few kbps and the high-rate traffic may be video packets at a few Mbps. In wireless network components, the low rate may be associated with Bluetooth® packets at ~1 Mbps and the high rate with WiFi® packets at ~1 Gbps.

The effective interleaving of different data rates on the same bus is achieved by an adaptive control system on each end of a high-speed bus. Not only does this "statistical aggregator" decide when to transmit or receive low-rate or high-rate data, but it activates power-consuming components such as PLLs only when they are needed (e.g. for high-rate traffic) and deactivates them when they are not needed. Thus the shared-bus schema reduces power consumption as well as necessary physical size and interface signals. Some embodiments of the statistical aggregator minimize idle time, data loss, and data errors by dynamically optimizing the interleaving. Some embodiments of the dynamic optimization include allocating time slots to different traffic rates based on predictions of characteristics of future traffic. The predictions are derived by processing recorded traffic profiles from the past and characterizing traffic requests in the present.

Embodiments of the solutions are applicable not only to multi-com chips but also to SoCs and system-level external bus interfaces such as PCIe, Secure Digital Input/Output (SDIO), Mobile Industry Processor Interface Low Latency Interface (MIPI LLI), etc. Various embodiments save power, improve cost structure of cost-sensitive devices, reduce footprint, improve connectivity, and enable a wider range of form factor designs.

Figure 2A:
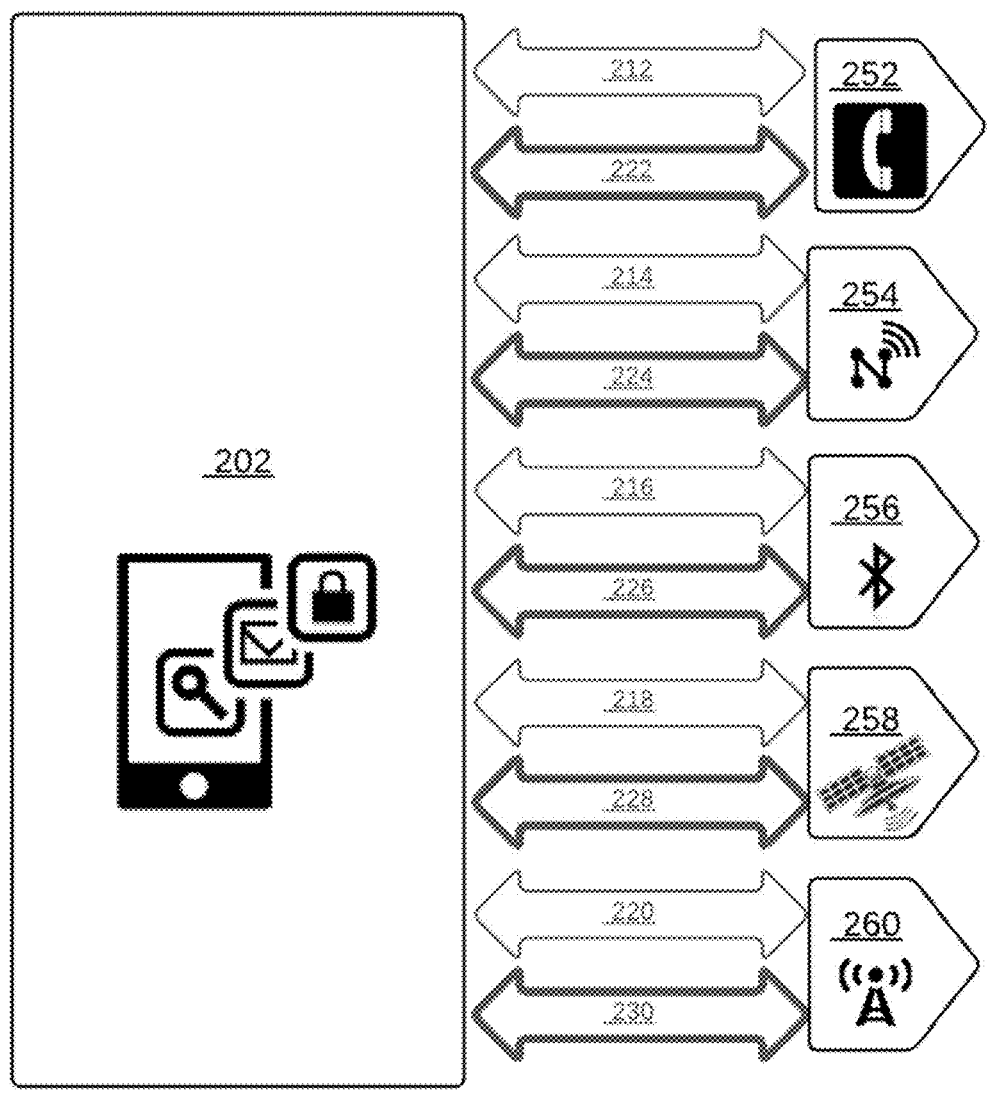
FIGS. 2A-B illustrate the effects of a statistical aggregator on an example application processor.
Figure 2B:
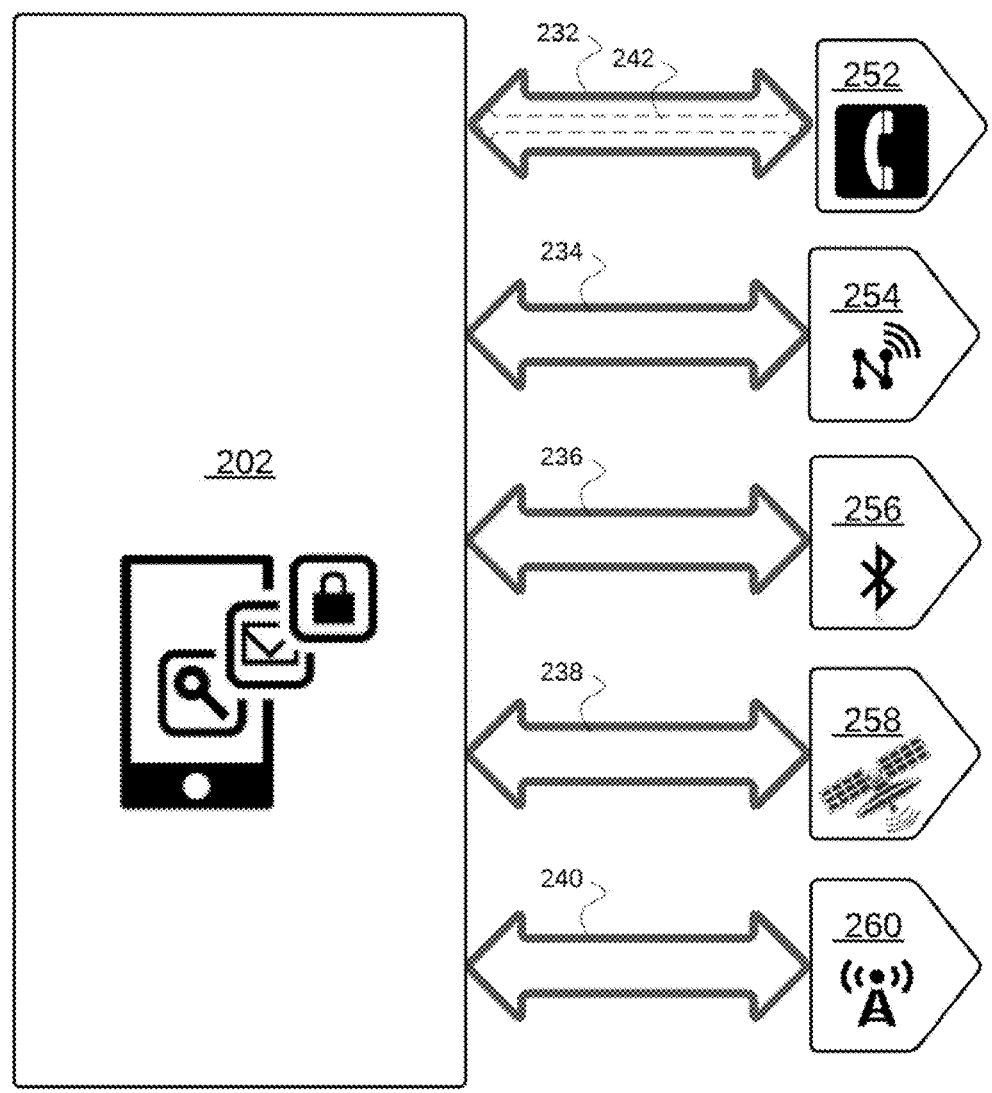

FIGS. 2A-B illustrate the effects of a statistical aggregator on an example application processor. FIG. 2A illustrates a multi-com device with traditional dedicated buses for high-rate traffic and low-rate traffic on each link. The host chip, application processor (AP) 202, requires 10 bidirectional buses to transmit and receive five different signal modalities. Cellular link 252 is served by low-rate bidirectional bus 212 and high-rate bidirectional bus 222. Likewise, low-rate bus 214 and high-rate bus 224 connect AP 202 to wireless local area network 254 (WLAN, e.g., WiFi®) 254. Low-rate bus 216 and high-rate bus 226 connect to short-range communication link (e.g., Bluetooth®) 256; low-rate bus 218 and high-rate bus 228 connect to global navigation satellite system (GNSS, e.g., global positioning satellite GPS) 258, and low-rate bus 220 and high-rate bus 230 connect to frequency-modulated (FM) radio link 260. For each link, a low-rate bus is always available because high-rate traffic has its own dedicated bus.

FIG. 2B illustrates the multi-com device with shared buses configured to carry interleaved high-rate and low-rate traffic. In this embodiment, each of the communication links 252, 254, 256, 258, 260 is connected to AP 202 by single bus designed for high-rate traffic. The high-rate buses 232, 234, 236, 238, 240 are also capable of carrying low-rate traffic, illustrated as dotted-line arrow 242. The interleaving allows high-rate traffic in one group of separated time slots and low-rate traffic at times between the high-rate time slots. The time slot lengths, frequencies, and separations are determined by a policy applied by the statistical aggregator. The policy may be fixed (e.g., "only allow high-rate traffic into the bus when no low-rate traffic is present"), or it may adapt to changing conditions (e.g., "buffer the low-rate traffic for a length of time that varies in proportion to the amount of high-rate traffic"). When the policy is tailored to the character of the traffic in each link, the performance will be comparable to separate dedicated buses in less space, for lower cost, and using less power.

Figure 3:
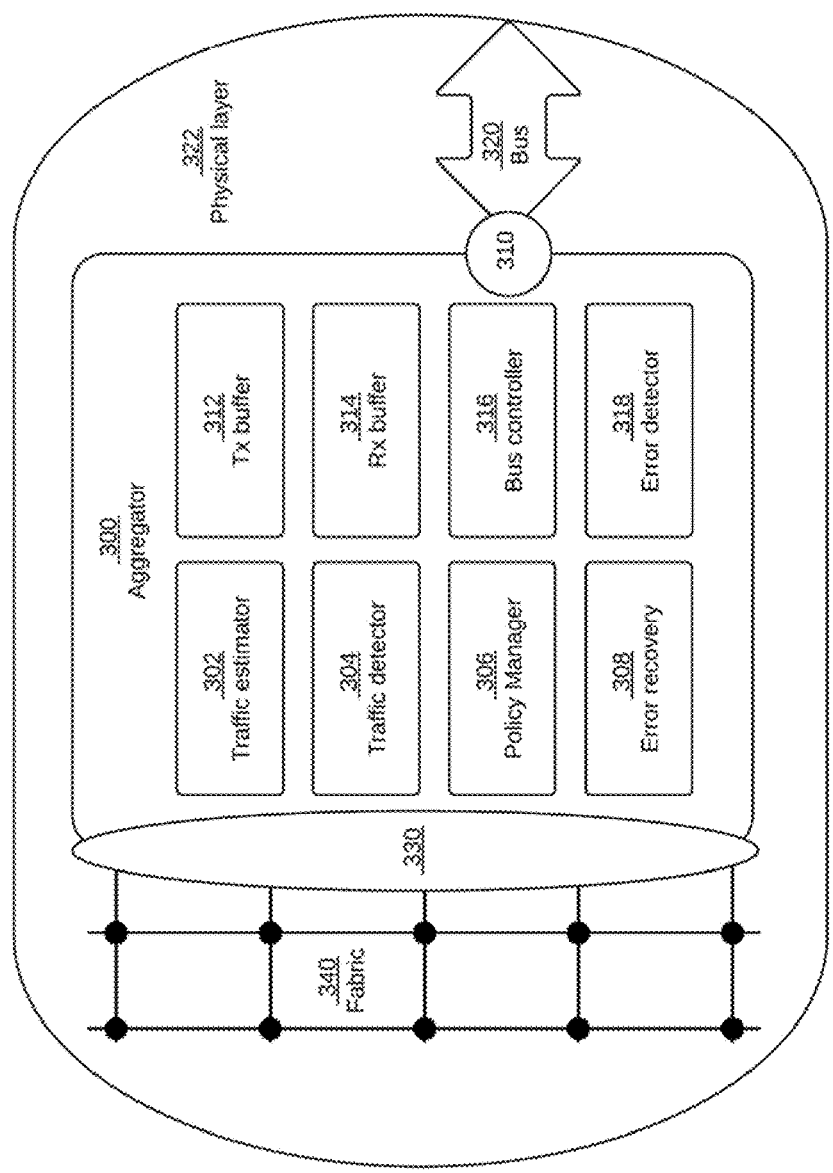
FIG. 3 is a block diagram of an example embodiment of a statistical aggregator configured to control traffic interleaving.

FIG. 3 is a block diagram of an example embodiment of a statistical aggregator configured to control traffic interleaving. The components may be arranged and connected in a number of alternative ways. The components of aggregator 300 may include fabric interface 330 to on-chip fabric 340; bus interface 310 to bus 320; bus controller 316; transmission buffer 312; reception buffer 314; traffic estimator 302; traffic detector 304; policy manager 306; error detector 318; and error recovery 308.

Bus 320 may be an internal bus or an external bus. Bus interface 310 may recognize the system protocol and can distinguish data packets from other signals such as address, commands, and error recovery information. Bus controller 316 controls bus interface 310 and implements the relevant protocols and standards, e.g. the Advanced High-performance Bus (AHB) or Advanced Peripheral Bus (APB) standards of the Advanced Microprocessor Bus Architecture (AMBA). In some embodiments, the bus controller applies a different protocol to high-rate traffic than to low-rate traffic.

Transmission buffer 312 and reception buffer 314 may be, for example, first-in-first-out (FIFO) buffers that at any given time may contain low-rate data, may contain high-rate data, or may be empty. Transmission buffer 312 holds outgoing traffic of a different rate than the traffic presently being transmitted to bus 320. For example, if low-rate traffic is being transmitted to bus 320, transmission buffer 312 holds any outgoing high-rate traffic until the policy requires that high-rate traffic be transmitted and the low-rate traffic be held. At that point, all the high-rate traffic will be emptied from transmission buffer 312 and transmitted to bus 320 before transmission buffer 312 begins to hold low-rate traffic. Reception buffer 314 performs an analogous function on traffic being received from bus 320. Between them, the buffers can compensate gaps or absorb bursts in the traffic being handled by the bus.

In some embodiments, a transmission or reception buffer becoming full, or becoming filled above a threshold fraction, may trigger a rate switch to balance the load and make room in the buffer.

If traffic propagates through bus 320 at more than two rates, additional transmission buffers 312 and reception buffers 314 may be added to aggregator 300. If the bus carries traffic with N different data rates, some embodiments of aggregator 300 will need at least N−1 transmission buffers 312 and the same number of reception buffers 314, so that all the traffic not presently in bus 320 remains separated by rate.

Error detector 318 detects errors in the traffic. Any applicable technique, such as a cyclic redundancy code (CRC, sometimes "cyclic redundancy code"), may be used to detect the errors. Error recovery 308 implements traffic fixes when errors are detected. Any applicable technique, such as CRC, error correcting code (ECC), forward error correction (FEC), or the like may be employed for error recovery.

Traffic estimator 302 is included in some embodiments with adaptive interleaving policies. Traffic estimator 302 monitors statistics of ongoing traffic and uses those statistics to predict the behavior of future traffic. Some embodiments may predict future traffic based only on present traffic, while other embodiments may look at trends in traffic statistics from sometime in the past to the present and extrapolate the trends into the future. The statistics may be collected heuristically from any suitable parameters. Non-limiting examples include minimum, average, and maximum (1) throughput rate in bps; (2) latency in seconds; (3) quality of service (e.g., BER) requested vs. actually provided; (4) bus power consumption; or (5) arrangement of data in the slots of multi-slot packets. Either raw measurements or statistically reduced data may be compared to threshold values. The threshold values may be constant, dependent on application or data type, or adaptive (e.g., adjusted to fit the most recently measured average, median, or trend). Statistical data may be analyzed on the fly or offline (e.g., by system designers testing the effectiveness of different measurements or calculations).

Traffic detector 304 detects the rate of traffic allowed through the bus by a policy from moment to moment. The policy may be predetermined, or it may be adaptive using statistics from traffic estimator 302. The traffic detector may examine the data stream either continuously, periodically, or sporadically in response to a trigger such as the host processor starting an application that requires particularly high data quality. The policy may change the rate of traffic allowed into the bus based on mode of operation, channel allocation, priority definition, or timeout. In some embodiments, the policy may time the switching events based on knowledge of the typical traffic profile (e.g., if the timestamp of one type of traffic characteristically places data in slot X and control in slot Y, the switching may be timed to maintain timestamp synchronization). Policy manager 306 commands bus controller 316 to switch the traffic rate allowed into the bus in response to either traffic detector 304's detection of the requirements of the policy or a direct command from a connected processor (not explicitly shown).

Bus interface 310 includes all the circuitry supporting the physical implementation of bus 320. In some embodiments, bus interface 310 may include one or more clock recovery mechanisms, input/output drivers, hardware for synchronization or bit alignment, or PLLs.

In some embodiments, aggregators 300 are deployed at each end of bus 320 with identical policies. In some embodiments, the aggregators at the two ends communicate with each other. For example, the transmitter and receiver may exchange handshake signals expressing whether each of them can or cannot presently tolerate additional high-rate traffic (e.g., because an above-threshold fraction of the computational resources at that end are already occupied). The policy can require that one of the conditions for sending high-rate traffic through the bus is that both handshake signals are simultaneously "Yes" ("more high-rate traffic can be tolerated").

Figure 4:
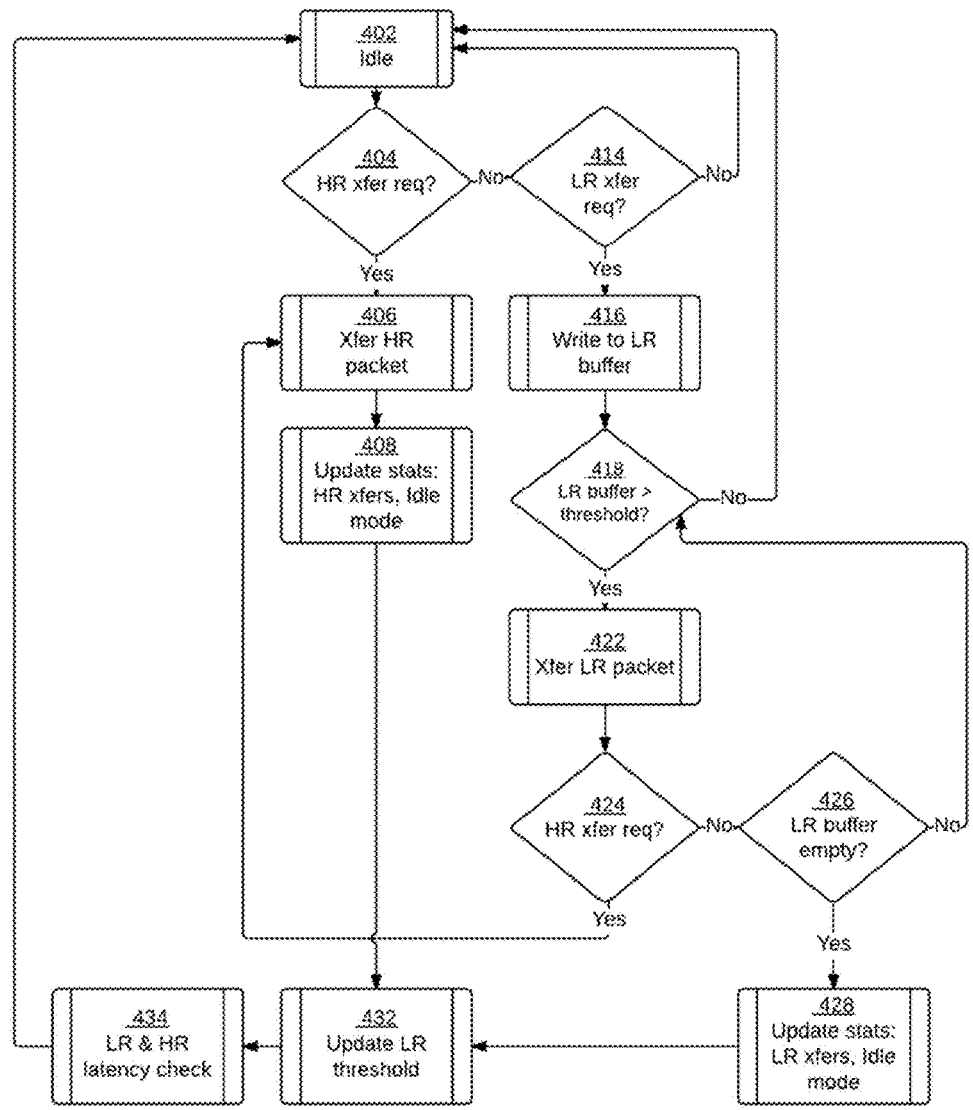
FIG. 4 is a simplified flowchart of a policy for some embodiments of a statistical aggregator.

FIG. 4 is a simplified flowchart of a policy for some embodiments of a statistical aggregator. For ease of understanding, this flowchart ignores the bidirectional aspects of the traffic and the adaptive adjustment of bus configuration to trade off the operational goals of high throughput, low bit error rate (BER), and low packet loss. In some embodiments, more than one "low" rate may be defined to set priorities among different types of low-rate traffic. For example, audio traffic (1-10 kbps) and video traffic (1-10 Mbps) are both low-rate compared to WiFi traffic (~1 Gbps), but video is still a much higher rate than audio. A policy may be created with different priorities for each of the kbps. Mbps, and Gbps ranges; make audio traffic a higher priority than browser traffic; or vice versa.

In this example, high-rate traffic has priority over low-rate traffic. At step 402, the system is idle while there are no data transfer requests. Periodically, the system checks for high-rate traffic in step 404 and for low-rate traffic in step 414. The transfer requests may be for either reception of inbound traffic or transmission of outbound traffic.

If a high-rate data transfer request is received, the subject packet is immediately transferred in step 406. The traffic estimator then updates its statistics to reflect the latest high-rate data transfer and the preceding idle period. The updated statistics are used to calculate an updated low-rate threshold in step 432. After a latency check on both the low-rate and high-rate traffic, the system returns to idle.

If a low-rate data transfer request is received, the subject packet is written to the low-rate buffer (e.g. a FIFO buffer) in step 416. The bus controller or other appropriate component checks in step 418 whether the low-rate buffer is filled with data to or above a threshold calculated from statistics collected by the traffic estimator. If the low-rate buffer is not filled to the threshold, the system resumes idling in step 402. If the low-rate buffer is filled to or past this threshold, one or more of the low-rate packets is retrieved from the low-rate buffer and transferred in step 422. In a FIFO buffer, the oldest packets are transferred first.

In some embodiments, the PLL and other power-consuming components that are only strictly needed for handling high-rate traffic are temporarily deactivated while the aggregator is handling low-rate traffic. The quality of the low-rate traffic is insured by running error detection and correction algorithms, which at the low data rate has sufficient time to run effectively.

After a low-rate packet transfer in step 422, the aggregator responds to any new high-rate transfer requests in step 424 by immediately transferring the high-rate packets in step 406, leaving the remaining low-rate packets in the buffer while accommodating the higher-priority request. If no new high-rate transfer requests are detected in step 424, and the buffer is not found to be empty in step 426, the aggregator repeats steps 418, 422, 424, and either 428 (if no new high-rate transfer requests are detected in step 424) or steps 406, 408, 432, and 434 (if step 424 detects one or more new high-rate transfer requests).

If the buffer is empty in step 426, the traffic estimator updates its statistics to reflect the latest low-rate transfer and the preceding idle period. The updated statistics are used to calculate an updated low-rate threshold in step 432. After a latency check on both the low-rate and high-rate traffic, the system returns to idle.

A broad range of different policies can be tailored to different applications. For example, a streaming media player may have low-rate audio packets embedded in a stream of high-rate video packets, and the use of the buffers may be constrained to prevent a humanly detectable lack of synchronization between the audio and video.

Figure 5:
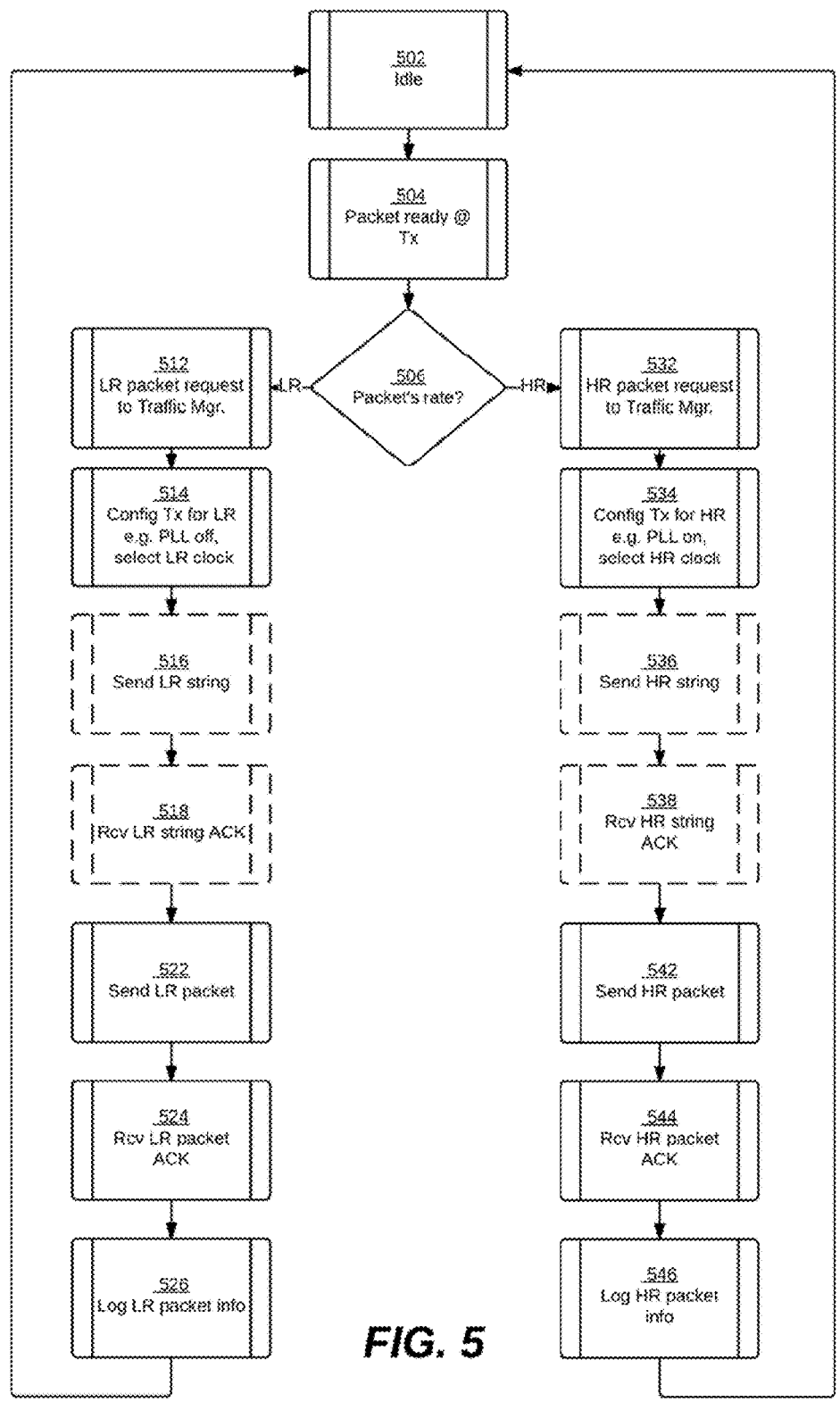
FIG. 5 is a flowchart of an example of packet transmission controlled by a statistical aggregator with optional software intervention.

FIG. 5 is a flowchart of an example of packet transmission controlled by a statistical aggregator with optional software intervention. The aggregator defaults to an idle state in step 502 until it receives information 504 that a data packet is ready to be transmitted. In this example, the policy gives equal priority to high-rate and low-rate traffic. The system determines at decision 506 whether the packet is a low-rate packet or a high-rate packet.

For a low-rate packet, the transmitter sends a low-rate packet transfer request to the traffic manager in step 512 and configures the transmitter for low-rate transmission in step 514, which may include turning off unneeded power-consuming components (such as a PLL) and selecting, from multiple available clock signals, a preferred clock signal for low-rate traffic. Optionally, if the embodiment includes software intervention. In embodiments that include software intervention, the transmitter may send a transfer string for the low-rate packet to the bus in step 516 and wait for an acknowledgement of the string from the receiving component in step 518. Embodiments without software intervention may skip steps 516 and 518. The transmitter sends the LR packet in step 522, waits to receive the LR packet acknowledgement from the receiving component in step 524, and logs the LR packet's information for the statistical aggregator to include in the statistics for estimating future traffic.

For a high-rate packet, the transmitter sends a high-rate packet transfer request to the traffic manager in step 532 and configures the transmitter for high-rate transmission in step 534, which may include turning on needed enhancements (such as a PLL) and selecting, from multiple available clock signals, a preferred clock signal for high-rate traffic. Optionally, if the embodiment includes software intervention, the transmitter may send a transfer string for the high-rate packet to the bus in step 536 and wait for an acknowledgement of the string from the receiving component in step 538. Embodiments without software intervention may skip steps 536 and 538. The transmitter sends the HR packet in step 542, waits to receive the HR packet acknowledgement from the receiving component in step 544, and logs the HR packet's information for the statistical aggregator to include in the statistics for estimating future traffic.

Figure 6:
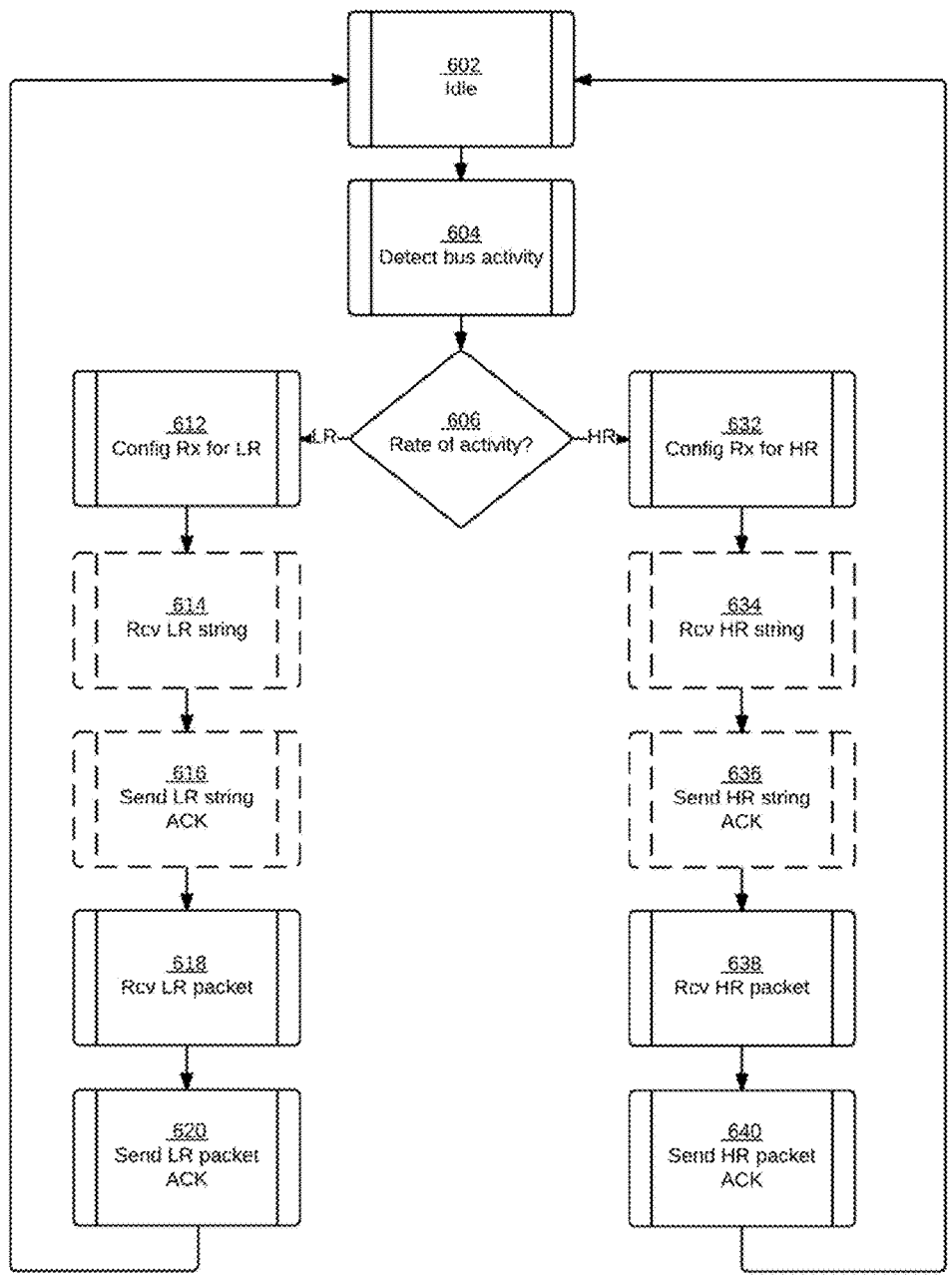
FIG. 6 is a flowchart of packet reception controlled by a statistical aggregator with optional software intervention.

FIG. 6 is a flowchart of packet reception controlled by a statistical aggregator with optional software intervention. The aggregator begins in an idle state at step 602. At step 604 the aggregator detects bus activity and splits the path at step 606 depending on whether the activity is low-rate or high-rate. This example policy treats low-rate and high-rate traffic equally.

If the activity is low-rate, the aggregator configures the receiver for low-rate reception in step 612. In embodiments with software intervention, a low-rate string is received from the transmitter on the other end of the bus in step 614, which the receiver acknowledges in step 616; embodiments without software intervention may skip steps 614 and 616. The receiving component receives the low-rate packet in step 618, sends an acknowledgment of the packet back to the transmitter in step 620, and returns to idle state 602.

If the activity is high-rate, the aggregator configures the receiver for high-rate reception in step 632. In embodiments with software intervention, a high-rate string is received from the transmitter on the other end of the bus in step 634, which the receiver acknowledges in step 636; embodiments without software intervention may skip steps 634 and 636. The receiving component receives the high-rate packet in step 638, acknowledges the packet in step 640, and returns to idle state 602.

The policies, statistical aggregation, correction, and other numerical processes may be implemented as hardware (e.g., logic blocks), software, or a combination of both that varies from the combinations in these examples.

The preceding description and accompanying drawings describe example embodiments in some detail to aid understanding. However, the scope of the claims may cover equivalents, permutations, and combinations that are not explicitly described herein.

We claim:

1. A device, comprising:
   a bus interface to transmit outgoing information and receive incoming information via a bus;
   a buffer coupled to the bus interface;
   a traffic estimator coupled to the bus interface, the traffic estimator to analyze present traffic and to estimate future traffic based on the analysis of the present traffic;
   a traffic detector coupled to the traffic estimator, the traffic detector to make a determination of whether the bus interface is to transmit traffic via the bus at a first traffic rate or at a second traffic rate, wherein the first traffic rate and the second traffic rate are different traffic rates and wherein the determination is at least partially based on the traffic estimator's estimate of the future traffic; and
   control logic to cause the bus interface to transmit traffic via the bus at the first traffic rate and to direct traffic to be transmitted at the second traffic rate to the buffer in response to the traffic detector's making a determination of whether the bus interface is to transmit traffic via the bus at the first traffic rate.

2. The device of claim 1, further comprising an error detector to detect traffic errors.

3. The device of claim 2, further comprising an error recovery component to correct the traffic errors.

4. The device of claim 3, wherein the error recovery component includes a cyclic redundancy code, an error correcting code, or forward error correction.

5. The device of claim 2, wherein the error detector is a cyclic redundancy code.

6. The device of claim 1, wherein a required traffic rate is based on a policy; and wherein the policy is defined by at least one of operational mode, channel allocation, or priority definition.

7. The device of claim 6, where the policy is continually updated.

8. The device of claim 6, wherein the policy is fixed to allow only traffic transmitted at the first rate when there is no traffic at the second rate.

9. The device of claim 6, wherein the policy is to change based upon changes in first traffic rate and second traffic rate conditions.

10. The device of claim 6, wherein analysis of the present traffic includes a selected one of: throughput rate, latency, quality of service measurements, bus power consumption, or arrangement of data in slots of multi-slot packets.

11. The device of claim 1, wherein a required traffic rate is based on timeout.

12. The device of claim 1, further comprising an interface to an on-chip fabric.

13. The device of claim 1, wherein the traffic estimator is to estimate future traffic based on an analysis of past traffic.

14. The device of claim 1, wherein the device is coupled with an on-chip bus interface or system-level bus interface.

15. The device of claim 1, wherein the traffic transmitted via the bus at the first traffic rate is video or audio traffic, and the traffic transmitted via the bus at the second traffic rate is video or Wi-Fi traffic.

16. The device of claim 1, wherein the first traffic rate and the second traffic rate are two of three or more different traffic rates.

17. The device of claim 1, wherein the buffer is a first in first out (FIFO) buffer.

* * * * *